United States Patent [19]

Landry

[11] Patent Number: 4,926,597
[45] Date of Patent: May 22, 1990

[54] DEVICE FOR COLLECTING SAP

[75] Inventor: Bernard Landry, St-Damien, Canada

[73] Assignee: IPL Inc., St-Damien, Canada

[21] Appl. No.: 182,281

[22] Filed: Mar. 29, 1988

[51] Int. Cl.$^5$ .............................................. A01G 23/10
[52] U.S. Cl. .......................................... 47/52; 47/50; 239/272
[58] Field of Search .................... 47/50, 51, 52, 53, 54; 239/271, 272, DIG. 4; 406/152; 15/415 A, 420; 137/317; 222/551, 570

[56] References Cited

U.S. PATENT DOCUMENTS

| | | | |
|---|---|---|---|
| 225,762 | 3/1880 | Pierce | 47/52 |
| 281,694 | 7/1883 | Hopf | 137/317 |
| 766,083 | 7/1904 | Watts | 222/570 |
| 1,328,104 | 1/1920 | Servis | 239/272 X |
| 3,106,318 | 10/1963 | Cook | 222/551 |
| 3,204,370 | 9/1965 | Lamb | 47/52 |
| 3,469,344 | 9/1969 | Garvey | 47/53 |
| 3,596,402 | 8/1971 | Palmer | 47/53 |
| 4,512,104 | 4/1985 | Lamb | 47/52 |

Primary Examiner—Robert A. Hafer
Assistant Examiner—Sam Rimell
Attorney, Agent, or Firm—Dorsey & Whitney

[57] ABSTRACT

The disclosure herein describes a device for collecting sap from trees and directing the sap to a sap collecting system operatable under vacuum conditions; it comprises a hollow body including a frusto-conical section adapted to be forced into the outer layers of a tree to be sap-collected. Adjacent the open end of the section is a series of longitudinal sap irrigating grooves allowing the sap to be collected and directed into the hollow body with the system is operating under vacuum conditions. To prevent air from being sucked into the hollow body as a result of the vacuum effect, the frusto-conical section has a groove in which is received a resilient element sealing the body to the of tree layers.

8 Claims, 2 Drawing Sheets

DEVICE FOR COLLECTING SAP

FIELD OF THE INVENTION

The present invention relates to a device for collecting sap from trees and for directing the sap to a sap-collecting system.

BACKGROUND OF THE INVENTION

Recent tree sap-collecting systems consist of a network of interconnected tubings allowing the sap collected from a tree to be vacuum sucked directly to a central sap processing unit.

It has been found that, in cases where a sap-collecting device is not tightly engaged into the tree, the vacuum system also draws outside air into the system.

OBJECTS AND STATEMENT OF THE INVENTION

It is an object of the present invention to obviate the above described problems associated with present sap-collecting systems. This is achieved by providing a sap-collecting device which, when forced into the outer layers of a tree, an air-tight seal is obtained insuring that the vacuum will cause the collecting of the sap only. To achieve this purpose, the device is provided with an annular groove in which is inserted an element sealingly engaging the outer layers of the tree from which sap is to be collected.

The present invention therefore relates to a device for collecting sap from trees and for directing the sap to a sap-collecting system operatable under vacuum conditions. It comprises a hollow body having an open end and a closed end, the body including a frusto-conical section adapted to be forced into the outer layers of a tree to be sap-collected; the frusto-conical section displays, adjacent to the open end of the body, sap irrigating means to allow sap in the outer layers to be collected and directed to the open end and into the hollow body; the frusto-conical section displays thereon an annular groove which is located in the layers when the section is engaged in the tree; an a resilient sealing means is secured is received in this groove providing a sealing engagement with the layers to thereby prevent air infiltration in the body when the sap collecting system is operating under vacuum conditions; the closed end of the body displays a rigid section adapted to be hit in order to force the frusto-conical portion into the layers; and tube securing means extend perpendicularly of the hollow body; the securing means are hollow and contiguous with the hollow body for directing sap collected to the sap-collecting system.

In one form of the invention, the resilient sealing means consists of a rubber O-ring received in the groove.

In another form of the invention, the sealing means consists of a rubber band gasket having a portion secured in the groove.

Other objects and statement of the invention will become apparent from the detailed description given hereinafter. It should be understood, however, that this detailed description, while indicating a preferred embodiment of the invention, is given by way of illustration only, since various changes and modifications within the spirit and scope of the invention will become apparent to those skilled in the art.

DESCRIPTION OF PREFERRED EMBODIMENTS

Figure 1:
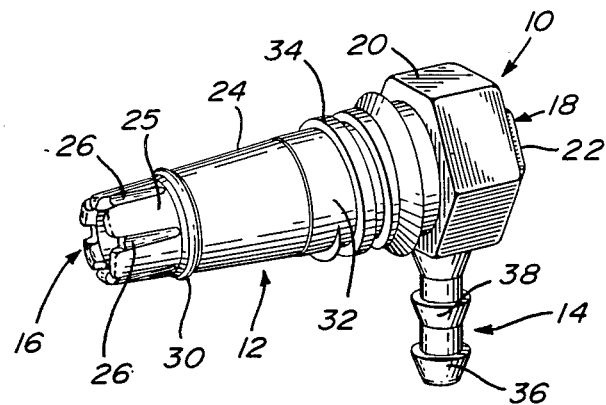
FIG. 1 is a perspective view of a sap-collecting device made in accordance with the present invention.

FIG. 1 shows a sap-collecting device 10 that includes a hollow body 12 and a tube collecting extension 14, the body and the extension being integral and made of plastic material.

The hollow body 12 comprises an open end 16 and a closed end 18. The closed end 18 defines a rigid section consisting of a large hexagonal shape portion 20 and a smaller hexagonal extension 22. A frusto-conical section 24 extends between the hexagonal portion 20 and the open end 16. The portion adjacent the open end 16 displays a series of longitudinal circumferentially spaced grooves 26 which terminate short of the extremity of portion 25 thereby allowing access inside the hollow interior of the body 12. The frusto-conical portion also includes a groove 28 in which is received an O-ring made of resilient material, preferably rubber. The hollow body includes a cylindrical portion 32 on which is formed a thread 34 which serves to receive a threaded cap (not shown) to close off the end 16 of the device when it is not used in a sap collecting operation.

Extension 14 is provided with a series of conical portions 36 and 38 allowing it to be fixedly secured to a tube 40 which forms part of the sap collecting system which collects and directs sap to a central sap processing unit (not shown).

To install the sap collecting device 10 in a tree 42 having a bark layer 44 and a series of layers, (the more recently formed being located adjacent the bark layer), a hole is made in the tree with an appropriate tool and then the hollow body inserted. The latter is than forced into the hole with a proper hitting tool contacting the head 22 of the body. The body is therefore forcingly inserted into the hole 48 slightly compressing the tree layers. This is carried out until the O-ring 30 reaches the youngest layers of the tree. The O-ring thus seals the hollow body in the hole 48 so that, once the vacuum operation is under way, no air will penetrate from outside into the open end 16 of the body and combine with the sap. Similarly, the connection of the conical section 36 and 38 with the inner diameter of the tube 40 is such as to provide an air-tight seal between the extension and the tube.

Figure 2:
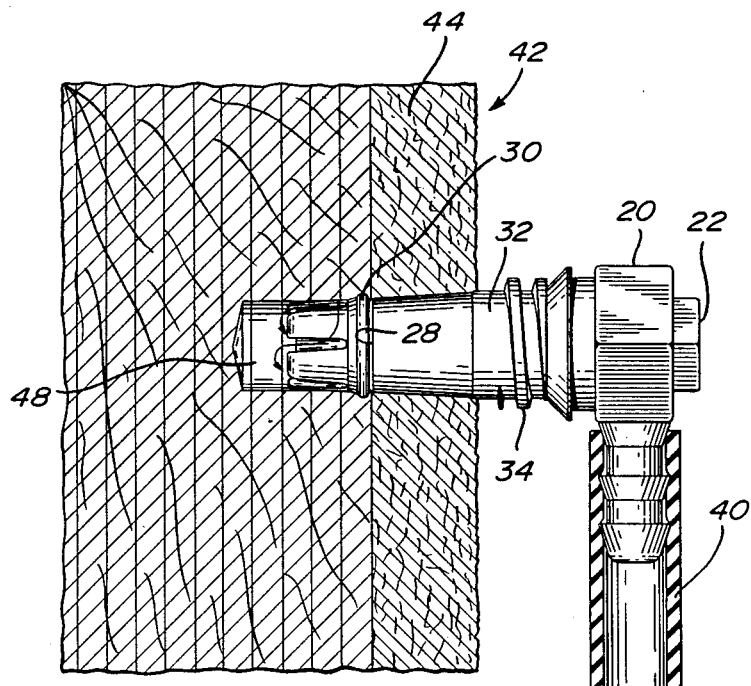
FIG. 2 is a side elevational view showing the sap-collecting device engaged into the outer layers of a tree and connected to a sap-collecting tubing.
Figure 3:
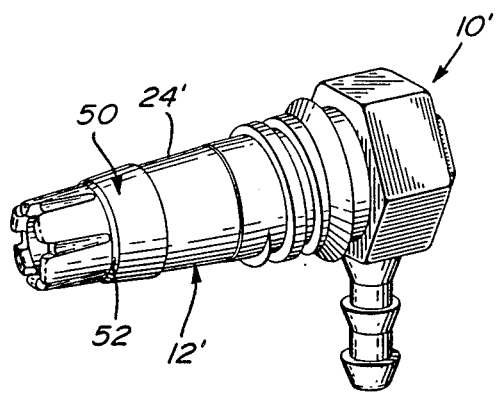
FIG. 3 is a perspective view of a sap-collecting device showing another embodiment made in accordance with the present invention.
Figure 4:
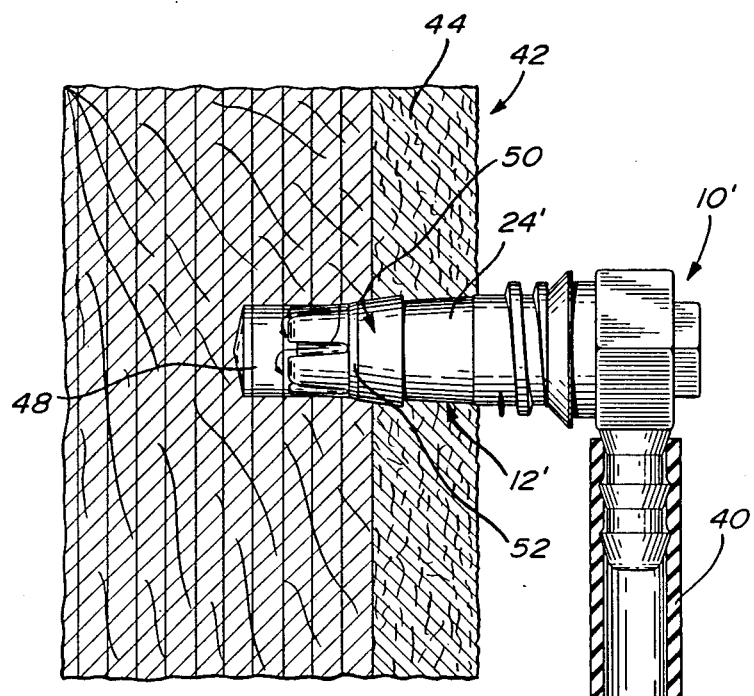
FIG. 4 is a side elevational view showing the sap-collecting device of FIG. 3 engaged into the outer layers of a tree.

Referring to FIGS. 3 and 4, the sap-collecting device 10 is identical in construction to the sap-collecting device 10 of FIGS. 1 and 2; however, in this embodiment a sealing gasket 50 in the shape of a frusto-conical band surrounds a portion of the frusto-conical section 24' of the body 12'. The frontmost edge 52 of the gasket is secured in the groove (not shown but similar to groove 28 of FIG. 2) provided on the body 12. The sealing gasket 50 is made of resilient material, preferably rubber. The installation of the rubber band 50 is similar to that of the O-ring 30 of FIGS. 1 and 2.

Although the invention has been described above in relation to one specific form, it will become evident to the person skilled in the art that it may be refined and modified in various ways. It is therefore wished to have it understood that the present invention should not be limited in interpretation except by the terms of the following claims.

The embodiments of the invention in which an exclusive property or privilege is claimed are defined as follows:

1. A device for collecting sap from trees and for directing said sap to a sap collecting system operable under vacuum conditions, comprising: a longitudinal hollow body having an open end and a closed end, said body including a frusto-conical section adapted to be forced into outer layers of a tree to be sap-collected, said frusto-conical section displaying, adjacent to the open end of said body, sap irrigating means having one end adjacent said open end to allow sap in said outer layers to be received and directed to said open end and into said hollow body; said frusto-conical section displaying thereon an annular groove which is located adjacent an opposite end of said sap irrigating means on said body; resilient sealing means having an inner portion tightly secured in said groove and an outer portion extending beyond said groove and engaging, when received in a tree, the adjacent tree layers to provide a sealing engagement between the frusto-conical section and the tree layers by radial compression to thereby prevent air infiltration in said body when said sap collecting system is operating under vacuum conditions; said closed end of said body displaying a rigid section adapted to be hit in order to force said frusto-conical section into said layers; and tube securing means extending perpendicularly from said rigid section, said securing means being hollow and contiguous with said hollow body for direction sap collected in said body to said sap collecting system.

2. A device as defined in claim 1, wherein said resilient sealing means is an O-ring received in said groove.

3. A device as defined in claim 1, wherein said resilient sealing means is a band gasket having a portion thereof secured in said groove.

4. A device as defined in claim 1 or 2, wherein said resilient sealing means is made of rubber.

5. A device as defined in claim 1, wherein said irrigating means consist of longitudinal grooves circumferentially spaced at said open end of said body.

6. A device as defined in claim 2, wherein said longitudinal grooves terminate short of the extremity of said open end of said body.

7. A device as claimed in claim 1, wherein said body and said tube securing means define a unitary device made of plastic material.

8. A device as defined in claim 1, wherein said tube securing means comprises a series of conical sections on the outer wall thereof.

* * * * *